United States Patent

O'Neill et al.

[15] 3,658,475
[45] Apr. 25, 1972

[54] METHOD OF PREPARING PURE NICKEL CARBONYL FROM IMPURE NICKEL COMPOUNDS

[72] Inventors: Charles Edward O'Neill, Glen Head, N.Y.; Frank Otto Theubert, Clarkson, Ontario, Canada

[73] Assignee: The International Nickel Company, Inc., New York, N.Y.

[22] Filed: Mar. 12, 1970

[21] Appl. No.: 19,071

[30] Foreign Application Priority Data

Mar. 27, 1969 Canada..................................047,061

[52] U.S. Cl. .........................................................23/203 C
[51] Int. Cl..............................................................C01g 53/02
[58] Field of Search..........................................23/203, 203 C

[56] References Cited

UNITED STATES PATENTS

| | | | |
|---|---|---|---|
| 2,590,078 | 3/1952 | Maeder.................................23/203 C |
| 2,548,727 | 4/1951 | Kincaid et al. ........................23/203 C |
| 3,079,235 | 2/1963 | Dakli et al..............................23/203 C |
| 2,757,077 | 7/1956 | Lewis et al. ............................23/203 C |
| 1,909,762 | 5/1933 | Grieb......................................23/203 C |
| 2,952,517 | 9/1960 | Podall et al. ...........................23/203 C |
| 3,282,648 | 11/1966 | Chiusoli et al. ........................23/203 C |

FOREIGN PATENTS OR APPLICATIONS

923,785 4/1963 Great Britain .......................23/203 C

Primary Examiner—Earl C. Thomas
Attorney—Maurice L. Pinel

[57] ABSTRACT

Directed to a process for recovering nickel from an impure reducible nickel compound wherein an aqueous bath containing the compound, either dissolved or undissolved, is treated with a water-soluble sulfide and a reducing agent which may be carbon monoxide, hydrogen, sponge iron, iron carbonyl, zinc powder or aluminum powder, then heating the aqueous bath having a pH no lower than that of an aqueous solution saturated with carbon dioxide under carbonylation conditions to a temperature between about 100° C. and 200° C. under a carbon monoxide partial pressure of more than about 30 atmospheres to form substantially pure nickel carbonyl which is then recovered.

30 Claims, No Drawings

METHOD OF PREPARING PURE NICKEL CARBONYL FROM IMPURE NICKEL COMPOUNDS

The present invention relates to the production of substantially pure nickel carbonyl from nickel-containing materials, and more particularly to the hydrometallurgical and vapometallurgical treatment of nickel-containing materials to produce substantially pure nickel carbonyl.

Nickel and other carbonyl-forming elements such as cobalt and/or iron are commonly copresent in materials, including materials such as ores, ore concentrates, mattes and even scrap, from which it is desired to recover nickel. Nickel has been and is being currently recovered from such materials by pyrometallurgical, hydrometallurgical, electrometallurgical and vapometallurgical techniques. However, such techniques often require large capital investments or involve costly processing steps in terms of labor or expensive chemical reagents and frequently the separation of nickel from cobalt and/or iron is incomplete or requires additional processing steps which add to production costs.

A particularly difficult problem is the production of nickel from lateritic ores since the nickel values in such ores are not readily concentrated by conventional ore dressing techniques. In most instances, lateritic ores are treated without any prior treatment except crushing, to produce ferronickel concentrates, ferronickel, ferronickel mattes or nickel-containing solutions all of which products are contaminated with iron and/or cobalt and require further purification by techniques that are frequently incomplete and/or expensive. Although attempts were made to overcome the foregoing difficulties and other difficulties, none, as far as we are aware, was entirely successful when carried into practice commercially on an industrial scale.

It has now been discovered that nickel-containing materials can be treated by a combination of hydrometallurgical and vapometallurgical techniques to produce a nickel product substantially free of cobalt and/or iron.

It is an object of the present invention to provide a combination of processing steps to recover substantially pure nickel carbonyl from nickel-containing materials.

Another object of the invention is to provide a combination of hydrometallurgical and vapometallurgical steps in order to recover substantially pure nickel carbonyl from nickel-containing materials.

The invention also contemplates providing a process for recovering substantially pure nickel carbonyl from material containing nickel and cobalt and/or iron by a combination of hydrometallurgical and vapometallurgical processing techniques.

Generally speaking, the present invention contemplates a process for recovering nickel as substantially pure nickel carbonyl from impure, reducible nickel compounds. The process comprises establishing an aqueous bath containing at least one impure, reducible nickel compound, either dissolved or undissolved; providing the aqueous bath, at least when the reducible nickel compounds are substantially insoluble in the aqueous bath under carbonylation conditions, with a small but effective amount of a water-soluble sulfide to promote subsequent carbonylation; adding a reducing reagent to the aqueous bath, while neutralizing any acids generated if other than carbonic acid, to maintain the solution at a pH no lower than that of an aqueous solution saturated with carbon dioxide under carbonylation conditions, and heating the aqueous bath to a temperature between about 100° C. and 200° C. under a carbon monoxide partial pressure of more than about 30 atmospheres to form substantially pure nickel carbonyl.

The term "reducible nickel compound" as used herein refers to compounds containing nickel which are reducible under the conditions of pressure and temperature employed during the carbon monoxide treatment. The compounds can be either soluble or insoluble in the aqueous bath. Thus, nickel chloride, nickel sulfate, nickel nitrate, nickel acetate, nickel formate, nickel carbonate, basic nickel carbonate, basic nickel sulfate, nickel hydroxide and nickel oxide can be purified in accordance with the process disclosed herein. For example, reducible nickel compounds containing or associated with non-carbonyl forming impurities, such as magnesia, alumina and silica, can be treated to produce purified nickel carbonyl. Even more surprisingly, practice of the present invention provides a process for separating nickel as substantially pure nickel carbonyl from reducible nickel compounds containing carbonyl-forming impurities. For example, nickel can be separated from cobalt and iron. In most instances, nickel compounds having nickel to cobalt mole ratios of greater than about 100:1 do not require additional purifications, but when the nickel to cobalt mole ratio is about 50:1 or less the process in accordance with the present invention can be advantageously employed to produce nickel to cobalt mole ratios far in excess of about 100:1.

When water-insoluble, nickel-containing compounds are employed, the compounds are advantageously freshly precipitated since freshly precipitated compounds have been found to be kinetically more reactive and greater amounts of nickel are extracted from such precipitates. The nickel compound is added to the bath to provide the aqueous bath with a nickel content of between about 0.5 mole per liter of bath (mole/l.) and 5 moles/l., advantageously the nickel content of the bath is between about 1 mole/l. and 4.5 moles/l. Higher and lower nickel contents can be employed but at higher contents materials handling becomes a problem while at lower contents, capital equipment is not economically utilized.

As noted hereinbefore, a reductant is added to the aqueous bath. The reductant can be the carbon monoxide employed for carbonylation or other reductants such as hydrogen, sponge iron, iron carbonyl, zinc and aluminum powder can be employed. The terms "reductant" or "reducing reagent" as used herein refer to substances capable of reducing the nickel compounds under carbonylation conditions. Solid, liquid and gaseous reductants are most frequently employed when a nickel-containing solution is being treated while gaseous reductants are used when treating a slurry of a water-insoluble nickel compound. When solid reductants are employed, it is advantageous to use them in the form of minus 100 mesh powder and in amounts not exceeding about 1.1 moles per mole of nickel contained in the bath. Hydrogen can be employed at partial pressures between about 20 to 40 atmospheres. Although hydrogen can be employed as a reductant, the carbonylation treatment is not as effective as when carbon monoxide is employed as the sole reductant.

The efficiency and extent of carbonylation of the nickel compound can be appreciably increased by various additions to the aqueous bath. For example, a nickel complexing compound selected from the group consisting of ammonia, monoethanolamine, 2-(2-aminoethylamino)ethanol, ethylenediamine, n-butylamine, 1,2-propanediamine and 1,3-propanediamine is effective in rendering the nickel compounds chemically reactive by forming complex nickel cations. When water-insoluble nickel compounds such as nickel hydroxide, nickel oxide and nickel carbonate, basic nickel sulfate and basic nickel carbonate are treated in an aqueous bath containing the foregoing nickel complexing compounds, it will be noted that the nickel compound is dissolved in the aqueous bath, which dissolution improves the rate and extent of carbonylation, i.e., the complexing compounds act as solubilizing agents. Nickel-complexing compounds, such as ammonia, monoethanolamine, 2-(2-aminoethylamino)ethanol, ethylenediamine, n-butylamine, 1,2-propanediamine and 1,3-propanediamine are also effective in neutralizing mineral acids generated when a nickel salt of a mineral acid is the feed material during carbonylation and, thus, the generated acids do not interfere with carbonylation. The particular nickel-complexing compound chosen should not be oxidizable by the feed material since in most instances such oxidation will destroy the useful properties of the compound. Thus, monoethanolamine should not be employed with a feed material containing substantial quantities of cobaltic hydroxide. Nickel-complexing compounds are added to the aqueous bath in amounts from about 2 to 8 moles per mole of nickel, and advantageously, from about 4 to 6 moles per mole of nickel. Higher and lower concentrations of nickel-complexing compounds can be employed but higher concentrations, particularly for those compounds of higher molecular weight, present materials-handling problems since they render the aqueous bath quite viscous while lower concentrations do not give the full benefits of increased kinetic activity. Other additives which are advantageously added to the aqueous bath are water-soluble sulfides such as sodium sulfide, sodium hydrosulfide, hydrogen sulfide, ammonium sulfide, potassium sulfide, barium sulfide and calcium sulfide. Water-soluble sulfides such as the foregoing are advantageously added to the bath in amounts of less than about 0.1 mole/mole of nickel in order to catalyze carbonylation. It is highly advantageous to employ water-soluble sulfides when water-insoluble nickel compounds are treated in the absence of nickel-complexing compounds since although some nickel in the water-insoluble compound will be carbonylated in the absence of sulfur the process is commercially unattractive because less than about 5 percent of the nickel is extracted from the compound whereas in the presence of sulfur more than about 85 percent of the nickel can be recovered. The sulfur-bearing material is advantageously added in amounts from about 0.01 to 0.1 mole of sulfur/mole of nickel. At lower amounts the full effects of the sulfur additive are not realized whereas at higher concentrations undue amounts of nickel sulfide are formed with a concomitant decrease in nickel extraction. The presence of a water-soluble sulfide also provides a more effective separation of nickel from other carbonyl-forming elements.

When treating nickel salts, such as nickel chloride, nickel sulfate and nickel nitrate, with gaseous reductants, acids corresponding to the nickel salts are formed. Carbonic acid, even when the aqueous bath is saturated with carbon dioxide, does not interfere with the carbonylation reactions, but other generated acids interfere with the reactions and must be neutralized. Thus, sufficient base to neutralize any generated acids, other than carbonic acid, must be added, either before or during carbonylation, to the aqueous bath. Bases such as sodium hydroxide, sodium carbonate, sodium bicarbonate and potassium hydroxide can be employed. However, it is particularly advantageous to employ one of the hereinbefore described nickel-complexing compounds to neutralize any acids formed. The acid neutralizing reagents are added at least in amounts which stoichiometrically correspond substantially to the amount of any acid generated if other than carbonic acid, i.e., sufficient base or neutralizing reagents are added to the aqueous bath to maintain the pH value thereof no lower than the pH value of an aqueous bath saturated with carbon dioxide at carbonylation conditions.

The carbonylation reactions are conducted at temperatures between about 140° C. and 180° C. under partial pressures of carbon monoxide of more than about 30 atmospheres. Under these conditions the nickel compound is carbonylated to produce nickel carbonyl substantially free of cobalt and/or iron carbonyl. At temperatures below about 140° C. the reactions either become uneconomically slow or cease altogether and at temperatures higher than about 180° C. nickel carbonyl begins to decompose and plate the apparatus. Advantageously, for purposes of control and nickel carbonyl yield, the aqueous bath is maintained at a temperature between about 165° C. and 175° C. A minimum carbon monoxide pressure of at least about 30 atmospheres must be applied to the aqueous bath in order to form nickel carbonyl, and advantageously, carbon monoxide partial pressures between about 50 atmospheres and 65 atmospheres are employed in order to insure rapid and complete reaction. Higher carbon monoxide partial pressures can be used but such higher pressures require considerably heavier equipment. The overall pressure over the aqueous bath will be higher than the pressures contributed by carbon monoxide since water displays superatmospheric vapor pressures at the reducing and carbonylating temperatures. Likewise, nickel-complexing compounds such as ammonia and monoethanolamine will contribute to the overall pressure. In operation, the overall pressure above the aqueous bath will be between about 60 atmospheres and 75 atmospheres.

After a sufficient time has elapsed, generally about 1 to 2 hours, the nickel carbonyl, which is present after cooling as an immiscible layer, is removed and the slurry remaining in the reaction vessel is filtered. The filtrate can be recycled to be slurried with fresh feed material, such as basic nickel carbonate, or can be treated to recover the residual nickel, cobalt and/or iron values contained therein. The residue or filter cake, which in most instances will have quite low nickel to cobalt or nickel to iron mole ratios, is treated by conventional techniques to recover the values therefrom. The liquid nickel carbonyl although already purified can be further purified by fractional distillation.

The process in accordance with the present invention can be conducted either on a batch or continuous basis. For example, the aqueous bath containing the contaminated nickel compound can be carbonylated and the substantially pure nickel carbonyl can be withdrawn after substantially all the nickel has been carbonylated. However, the process is advantageously conducted in such a manner that carbon monoxide is continuously passed through the aqueous bath and vented from the system so that nickel carbonyl and carbon dioxide, which carbon dioxide is a product of reaction, are continuously removed from the system to thereby increase the efficiency of the overall operation. Most advantageously, the overall process is conducted on a wholly continuous basis wherein impure nickel compounds are continuously added to the aqueous bath and carbon monoxide containing nickel carbonyl and carbon dioxide is continuously vented from the system. Nickel carbonyl withdrawn from the system by continuously venting carbon monoxide is in the gaseous state and must be cooled and condensed if further purification by fractional distillation is deemed desirable. However, in most cases, the mixture of carbon monoxide and nickel carbonyl can be immediately fed to decomposers without further treatment.

An important feature of the present invention is the ability to separate nickel from impurities commonly associated with nickeliferous ores, such as magnesia, silica and alumina. An even more important feature of the present invention is the selective nature of the carbonylation reaction so that nickel carbonyl substantially free of cobalt and/or iron carbonyl can be produced. Thus, the process in accordance with the present invention is advantageously employed in combination with the treatment of ores, ore concentrates, mattes or even scrap which contain nickel and which are contaminated with cobalt and/or iron. The nickel-containing material can be leached by well known processes to produce a solution, usually dilute, containing nickel and cobalt and/or iron. The solution can be directly treated in accordance with the present invention or the solution can be treated to precipitate nickel contaminated with cobalt and/or iron, and the precipitate, after separation by filtration or the like, can be treated for the recovery of substantially pure nickel carbonyl. The latter procedure is preferred in order to markedly lower the amount of water, e.g., dilute pregnant leaching solution, that would have to be handled. The process of the present invention is advantageously employed in conjunction with the treatment of nickel-containing lateritic ores, i.e., nickeliferous oxide ores, which are selectively reduced and leached with an ammoniacal ammonium carbonate solution. This nickel-containing solution is heated to remove ammonia and carbon dioxide by distillation and to precipitate a crude basic nickel carbonate which is treated in accordance with the present invention to produce substantially pure nickel carbonyl. Nickel-containing sulfate solutions can be obtained by leaching nickel-containing lateritic ores, generally of the limonitic variety, with sulfuric acid at elevated temperatures and pressures, either with or without prior selective reduction, to provide a solution with only minimal amounts of iron and the nickel sulfate solution can be treated in accordance with the present invention to produce nickel carbonyl. The latter two processes are particularly preferred since the steps preceding carbonylation are designed to minimize the amount of iron in either the precipitate or the solution.

In carrying the invention into practice, it is preferred to establish an aqueous bath containing between about 1 mole and 4.5 moles of nickel per liter of bath as a reducible nickel compound which is contaminated with at least one carbonyl-forming impurity selected from the group consisting of cobalt and iron, up to about 8 moles per mole of nickel of a nickel-complexing compound selected from the group consisting of ammonia, monoethanolamine, 2-(2-aminoethylamino)ethanol, ethylenediamine, n-butylamine, 1,2-propanediamine and 1,3-propanediamine, sufficient amounts of a base to neutralize any generated acids other than carbonic acid, and between about 0.01 mole per mole of nickel and 0.1 mole per mole of nickel of a water-soluble sulfide selected from the group consisting of sodium sulfide, sodium hydrosulfide, hydrogen sulfide, ammonium sulfide, potassium sulfide, barium sulfide and calcium sulfide. The nickel-containing aqueous bath is heated to a temperature between about 140° C. and 180° C. and treated with a reductant selected from the group carbon monoxide, hydrogen, sponge iron, iron carbonyl, zinc and aluminum powder and with carbon monoxide at partial pressures between about 50 atmospheres and 65 atmospheres to form substantially pure nickel carbonyl.

For the purpose of giving those skilled in the art a better understanding of the invention and/or a better appreciation of the advantages of the invention, the following illustrative examples are given:

EXAMPLE I

A 2-liter stainless steel autoclave, agitated at 1,600 revolutions per minute by a magnetically driven stirrer, was used for this example as well as all other examples. A slurry of 0.6 mole of freshly precipitated basic nickel-cobalt carbonate having a nickel to cobalt mole ratio of 2:1 in 300 milliliters (ml) of ammonium hydroxide and 200 ml of water was heated to 350° F. (177° C.) under a total pressure of 1,000 pounds per square inch gauge (psig) (68 atm. gauge) with a carbon monoxide partial pressure of 875 pounds per square inch (psi) (60 atm.) for 1 hour, under which condition a nickel-containing solution was formed. A total of 89.5 percent of the nickel was converted to nickel carbonyl which contained less than 0.05 percent cobalt by weight of nickel. The degree of separation of nickel from cobalt is readily apparent from the carbonylation residue which weighed 25.7 grams (gms), contained 8.6 percent nickel and 38 percent cobalt and had a nickel cobalt mole ratio of 1:4.1 as compared to a starting ratio of 2:1. The filtrate contained 0.27 gram per liter (gpl) nickel and 1.4 gpl cobalt. Thus, this example confirms that reducible nickel compounds containing cobalt can be treated by carbonylation in an aqueous bath to provide a sharp separation of nickel from cobalt.

EXAMPLE II

A fresh nickel-cobalt carbonate precipitate having a nickel to cobalt mole ratio of 15:1 (0.6 mole nickel carbonate and 0.04 mole cobalt carbonate) was slurried with an ammonium hydroxide solution of the same volume and strength as described in Example I and treated under the same conditions as described in Example I. After 1 hour of treatment at temperature and pressure, 95 percent of the nickel was recovered as nickel carbonyl which contained less than 0.05 percent cobalt by weight of nickel. The carbonylation residue weighed 7.5 grams and contained 21.1 percent nickel and 25.6 percent cobalt which shows that the separation of nickel from cobalt was effective since the nickel to cobalt mole ratio was lowered from 15:1 in the fresh precipitate to 1:1.2 in the carbonylation residue. The filtrate contained 0.88 gpl nickel and 0.07 gpl cobalt. A comparison of the results in Example I and the results obtained in this example confirms that with higher nickel to cobalt mole ratios in the starting materials greater recoveries of nickel are obtained for the same time of treatment.

EXAMPLE III

A 200 gram hydroxide precipitate containing 13.4 percent nickel and 5.88 percent cobalt as cobaltic hydroxide (nickel to cobalt mole ratio of 2.3:1) was slurried with 0.5 liter of an aqueous ammonium hydroxide solution as described in Example I and treated under the same conditions as described in Example I. The filtrate contained 1.8 gpl nickel and 0.5 gpl cobalt and the residue contained 15.5 percent of the total nickel and 93 percent of the total cobalt (i.e., a nickel to cobalt mole ratio of 1:2.6). The total amount of nickel recovered as nickel carbonyl was 81 percent and the nickel carbonyl contained less than 0.05 percent cobalt by weight of nickel.

The filtrate was brought up to ammonium hydroxide strength and slurried with another 200 grams of the hydroxide precipitate, which slurry was again treated as described in Example I. After filtration the residue contained 90 percent of the cobalt and only 10 percent of the nickel with a nickel to cobalt mole ratio of 1:3.8 as compared to 2.3:1 for the starting material and 1:2.6 for the above test starting without a nickel-containing aqueous bath. A recovery of 85 percent of the total nickel as nickel carbonyl was realized, which nickel carbonyl contained less than 0.05 percent cobalt by weight of nickel.

EXAMPLE IV

This example demonstrates the separation of nickel from iron and the desirability of employing starting materials with high nickel to iron mole ratios, particularly in the absence of sulfur-bearing materials. Basic nickel carbonate ferric hydroxide precipitates with different nickel to iron mole ratios were slurried with an aqueous solution containing 8 moles per liter of monoethanolamine at a rate of 80 grams of iron plus nickel per liter of aqueous solution. The slurries were heated to 350° F. (177° C.) in an autoclave as described in Example I under a total pressure of 1,000 psig (68 atm. g.) with a carbon monoxide partial pressure of 900 psi (61 atm.). After treating the slurry for 1 hour under the foregoing conditions the nickel carbonyl was recovered and the slurry was filtered in order to analyze the residue. The results of these tests are reported in Table I.

TABLE I

| Ni:Fe mole ratio in starting material | 4:1 | 2:1 | 1:1 | 0.5:1 |
| --- | --- | --- | --- | --- |
| % of total nickel in residue | 3.9 | 11.1 | 15.2 | 43.5 |
| % recovery of nickel as nickel carbonyl | 94.5 | 86.7 | 83.5 | 56 |
| Wt.% Fe as iron carbonyl in nickel carbonyl | n.d. | <0.01 | n.d. | n.d. | n.d. = not determined

The results in Table I confirm that nickel can be separated from iron as nickel carbonyl containing less than about 0.01 percent iron by weight of nickel and that increasing amounts of iron in the starting material substantially lower nickel recovery.

EXAMPLE V

This example shows the separation of nickel from iron with sponge iron being employed as a reductant. A nickel sulfate solution having a concentration of 50 gpl of nickel and to which varying amounts of sodium sulfide were added was slurried with 110 percent (based on nickel in solution) sponge iron. Upon heating in a reducing atmosphere the sponge iron was taken into solution as ferrous sulfate and therefore, the nickel solutions are considered to be contaminated with iron. It might be noted that the formation of ferrous sulfate avoids the generation of sulfuric acid and, therefore, a base is not required. The slurries were then heated to 350° F. (177° C.) for 1 hour under a total pressure of 1,000 psig (68 atm. g.) with a carbon monoxide partial pressure of 900 psi (61 atm.). The results of these tests are reported in Table II.

TABLE III

| Amount of added $Na_2S$ mole % | Ni recovered as $Ni(CO)_4$ in Wt. % of total Ni | Ni:Co mole ratio in residue | Wt.% Co in $Ni(CO)_4$* |
|---|---|---|---|
| 2 | 84.5 | 1.16:1 | <0.05 |
| 3 | 94 | 1:1.40 | <0.05 |
| 4 | 94.5 | 1:1.63 | <0.05 |
| 5 | 90.3 | 1:1.03 | <0.05 |
| 6 | 86.5 | 1.47:1 | <0.05 |
| 12.5 | 86.8 | 1.21:1 | <0.05 |

*Percentage is based on nickel and not on nickel carbonyl

TABLE II

| | | Carbonylation residue | | | | |
|---|---|---|---|---|---|---|
| S addition, mole percent | Residual Ni solution, g.p.l. | Wt. percent of total Ni | Wt. percent of total Fe | Residue, wt. percent Ni | Analysis, wt. percent Fe | Wt. percent $Fe(CO)_5$ in $Ni(CO)_4$ | Ni recovery, percent |
| 0 | 0.2 | 11.4 | 13 | 35.9 | 42.7 | 1.1 | 88.4 |
| 0.003 | 0.84 | 6 | 10 | 27.3 | 48 | N.d. | 93.1 |
| 0.01 [1] | 0.24 | 3 | 9.3 | 16.6 | 49 | N.d. | 96.7 |
| 0.05 [2] | 1 | 1 | 9.3 | 6.78 | 65 | N.d. | 98.0 |
| 0.1 | 0.06 | 1 | 10.3 | 5.7 | 60.7 | 0.2 | 99.0 |
| 0.25 | 0.11 | 2.4 | 11.5 | 12.1 | 60.4 | 0.3 | 97.5 |
| 0.5 | 0.08 | 2.0 | 9.3 | 11.1 | 54 | N.d. | 97.9 |

[1] = Final pressure only 920 p.s.i.g.
[2] = Run prematurely ended.
N.d. = Not determined.

It is readily apparent from Table II that even in the presence of metallic iron, which does not have to be reduced and therefore should be carbonylated with greater ease, the process of the present invention can lead to a reasonable separation of nickel from iron. However, the results in Table II dramatically confirm that the addition of controlled amounts of a sulfur-bearing material greatly enhances both the separation of nickel from iron and the overall recovery of nickel as nickel carbonyl from nickel sulfate solution. For example, it is shown in Table II that the residual amount of nickel in solution is cut almost in half and even more by the addition of sodium sulfide to the nickel sulfate solution and it is also shown that whereas 11.4 percent of the total nickel reports in the solid residue in the absence of sodium sulfide, controlled sulfide additions can lower the amount of nickel in the residue to 1.0 percent of the total nickel. Another important aspect of the sulfide addition is confirmed by the tests reported in Table II. As noted hereinbefore, the sulfide addition should not be so great as to form unduly large amounts of nickel sulfide which cannot be carbonylated under the conditions of the process in accordance with the present invention. Thus, Table II confirms that increasing amounts of sodium sulfide result in greater amounts, but still less than in the absence of sodium sulfide, of nickel in the solid residue.

EXAMPLE VI

This example confirms that sulfur-bearing material additions, such as sodium sulfide, increase the effectiveness of the separation and recovery of nickel from reducible nickel-cobalt-containing materials. Fresh basic nickel-cobalt carbonate precipitates with nickel to cobalt ratios of 10:1 were prepared by adding soda ash to nickel-cobalt sulfate solutions. The fresh precipitates were slurried with water at a rate equivalent to 80 gpl of nickel plus cobalt and different amounts of sodium sulfide were added to the slurries. The slurries were then heated to 350° F. (177° C.) for one hour under a total pressure of 1,000 psig (68 atm. g.) with a carbon monoxide partial pressure of 875 psi (60 atm.). The results of the tests are as follows:

The results in Table III show that with controlled amounts of sulfur over 90 percent of the nickel can be extracted as substantially pure nickel carbonyl. Furthermore, the results in Table III show that, as with iron, larger amounts of sulfur tend to depress nickel recovery, probably due to the formation of excessive amounts of nickel sulfide.

In order to show the effects of pressure, a like sample of the fresh precipitate was slurried with 4 mole percent sodium sulfide and treated under identical conditions except that a total pressure of 800 psig (54 atm. g.) (a carbon monoxide partial pressure of 665 psi or 45 atm.) was employed for 1 hour. Although the thus-produced nickel carbonyl contained less than 0.05 percent cobalt by weight of nickel, only 72.6 percent of the total nickel was recovered and the residue had a nickel to cobalt mole ratio of 2.7:1. From Table III it is seen that under otherwise identical conditions an increase of the total pressure by 200 psi can increase total nickel recovery from 72.6 to 94.5 percent while the purity of the nickel carbonyl suffers little, if any.

EXAMPLE VII

In order to demonstrate the effectiveness of the process while continuously venting the autoclave, the following example is presented. A slurry of basic nickel-cobalt carbonate having a nickel-cobalt ratio of 35:1 with 0.05 mole of sulfur as sodium sulfide per mole of nickel was treated in an autoclave at 350° F. (177° C.) at a carbon monoxide gauge pressure of 1,000 psig (68 atm. g.) at an exit flow rate of 7.5 liters per minute. The total amount of nickel extracted in 1.5 hours was 93 percent. The nickel carbonyl contained only 0.02 percent cobalt by weight of nickel. It will be recognized by those skilled in the art that the nickel carbonyl vapor could be condensed and collected as a liquid. The liquid nickel carbonyl can then be subsequently distilled to produce an even more pure form of nickel carbonyl.

It is to be observed that the present invention provides a process for recovering nickel as substantially pure nickel carbonyl from substantially water-insoluble, impure, reducible nickel compounds which comprises establishing an aqueous slurry of the impure, reducible nickel compound; adding a water-soluble sulfide to the slurry in small but effective amounts to promote carbonylation; heating the slurry to a temperature between about 100° C. and 200° C.; contacting the heated slurry with a reducing reagent and treating the heated slurry with carbon monoxide at partial pressures of more than about 30 atmospheres to form substantially pure nickel carbonyl.

It will be further observed that the invention provides a process for separating nickel from cobalt and iron contained in nickeliferous oxide ores which comprises leaching, with or without a prior selective reduction to reduce a preponderant part of the nickel and cobalt and only controlled amount of iron, the nickeliferous oxide ore to produce a pregnant aqueous solution of nickel and cobalt with controlled amounts of iron; precipitating nickel from the pregnant aqueous solution as water-insoluble reducible nickel compounds containing cobalt and controlled amounts of iron; recovering the precipitated water-insoluble reducible nickel compounds; establishing an aqueous slurry of said water-insoluble reducible nickel compounds; adding a water-soluble sulfide to the slurry in small but effective amounts to promote carbonylation; heating the slurry to a temperature between about 100° C. and 200° C.; contacting the heated slurry with a reducing reagent; and treating the heated slurry with carbon monoxide at partial pressures of more than about 30 atmospheres to form substantially pure nickel carbonyl.

Furthermore, the invention provides a process for recovering nickel as substantially pure nickel carbonyl from impure nickel salts which comprises establishing an aqueous solution of the impure nickel salt; heating the aqueous solution to a temperature between about 100° C. and 200° C.; adding a reducing reagent to the heated aqueous solution, while neutralizing generated acids other than carbonic acid and treating the heated aqueous solution with carbon monoxide at partial pressures of more than about 30 atmospheres to form substantially pure nickel carbonyl.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for recovering nickel as substantially pure nickel carbonyl from reducible nickel compounds containing impurities including at least one carbonyl-forming impurity selected from the group consisting of iron and cobalt which comprises establishing an aqueous bath containing an impure, reducible nickel compound; heating the aqueous bath to a temperature between about 100° C. and 200° C.; providing the aqueous bath, at least when the reducible nickel compounds are substantially insoluble in the aqueous bath under carbonylation conditions, with a small but effective amount of a water-soluble sulfide to promote carbonylation; adding a reducing reagent to the heated aqueous bath, while neutralizing any generated acids other than carbonic acid; and treating the heated aqueous bath with carbon monoxide at partial pressures of more than about 30 atmospheres to form substantially pure nickel carbonyl.

2. A process for recovering nickel as substantially pure nickel carbonyl from substantially water-insoluble reducible nickel compounds containing impurities including at least one carbonyl-forming impurity selected from the group consisting of iron and cobalt which comprises establishing an aqueous slurry of the impure, reducible nickel compound; adding a water-soluble sulfide to the slurry in small but effective amounts to promote carbonylation; heating the slurry to a temperature between about 100° C. and 200° C.; contacting the heated slurry with a reducing reagent; and treating the heated slurry with carbon monoxide at partial pressures of more than about 30 atmospheres to form substantially pure nickel carbonyl.

3. A process for recovering nickel as substantially pure nickel carbonyl from nickel salts containing impurities including at least one carbonyl-forming impurity selected from the group consisting of iron and cobalt which comprises establishing an aqueous solution of the impure nickel salt; heating the aqueous solution to a temperature between about 100° C. and 200° C.; adding a reducing reagent to the heated aqueous solution, while neutralizing any generated acids other than carbonic acid; and treating the heated aqueous solution with carbon monoxide at partial pressures of more than about 30 atmospheres to from substantially pure nickel carbonyl.

4. A process as described in claim 1 wherein carbonylation is conducted at a temperature between about 140° C. and 180° C.

5. A process as described in claim 1 wherein carbon monoxide partial pressures of between about 50 and 65 atmospheres are employed.

6. A process as described in claim 1 wherein the reducing reagent is carbon monoxide.

7. A process as described in claim 1 wherein fresh carbon monoxide is continuously added to maintain the carbon monoxide partial pressure at more than about 30 atmospheres and carbon monoxide containing carbon dioxide and substantially pure nickel carbonyl is continuously withdrawn.

8. A process for recovering nickel as substantially pure nickel carbonyl from reducible nickel compounds containing at least one impurity selected from the group consisting of iron and cobalt which comprises establishing an aqueous bath containing the reducible nickel compound; heating the aqueous bath to a temperature between about 100° C. and 200° C.; providing the aqueous bath, at least when the reducible nickel compounds are substantially insoluble in the aqueous bath under carbonylation conditions, with a small but effective amount of a water-soluble sulfide to promote carbonylation; adding a recovery reagent to the heated aqueous bath, while neutralizing any generated acids other than carbonic acid; and treating the heated aqueous bath with carbon monoxide at partial pressures of more than about 30 atmospheres to form substantially pure nickel carbonyl.

9. A process for recovering nickel as substantially pure nickel carbonyl from substantially water-insoluble reducible nickel compounds containing at least one impurity selected from the group consisting of iron and cobalt which comprises establishing an aqueous slurry of the impure, reducible nickel compound; adding a water-soluble sulfide to the slurry in small but effective amounts to promote carbonylation; heating the slurry to a temperature between about 100° C. and 200° C.; contacting the heated slurry with a reducing reagent; and treating the heated slurry with carbon monoxide at partial pressures of more than about 30 atmospheres to form substantially pure nickel carbonyl.

10. A process for recovering nickel as substantially pure nickel carbonyl from nickel salts containing at least one impurity selected from the group consisting of iron and cobalt which comprises establishing an aqueous solution of the nickel salt; heating the aqueous solution to a temperature between about 100° C. and 200° C.; adding a reducing reagent to the heated aqueous solution, while neutralizing any generated acids other than carbonic acid; and treating the heated aqueous solution with carbon monoxide at partial pressures of more than about 30 atmospheres to form substantially pure nickel carbonyl.

11. A process as described in claim 8 wherein carbonylation is conducted at a temperature between about 140° C. and 180° C.

12. A process as described in claim 8 wherein carbon monoxide partial pressures of between about 50 and 65 atmospheres are employed.

13. A process as described in claim 8 wherein the reducing reagent is carbon monoxide.

14. A process as described in claim 8 wherein fresh carbon monoxide is continuously added to maintain the carbon monoxide partial pressure at more than about 30 atmospheres and carbon monoxide containing carbon dioxide and substantially pure nickel carbonyl is continuously withdrawn.

15. A process as described in claim 8 wherein a nickel-complexing compound is employed to promote carbonylation.

16. A process as described in claim 8 wherein at least one nickel-complexing compound selected from the group consisting of ammonia, monoethanolamine, 2-(2-aminoethylamino)ethanol, ethylenediamine, n-butylamine, 1,2-propanediamine and 1,3-propanediamine is employed to promote carbonylation.

17. A process as described in claim 8 wherein at least one nickel-complexing compound selected from the group consisting of ammonia, monoethanolamine, 2-(2-aminoethylamino)ethanol, ethylenediamine, n-butylamine, 1,2-propanediamine and 1,3-propanediamine in amounts between about 2 moles per mole of nickel and about 8 moles per mole of nickel is employed to promote carbonylation.

18. A process as described in claim 8 wherein at least one nickel-complexing compound selected from the group consisting of ammonia, monoethanolamine, 2-(2-aminoethylamino)ethanol, ethylenediamine,n-butylamine, 1,2-propanediamine and 1,3-propanediamine in amounts between about 4 moles per mole of nickel and about 6 moles per mole of nickel is employed to promote carbonylation.

19. A process as described in claim 9 wherein the water-soluble sulfide is selected from the group consisting of hydrogen sulfide, sodium sulfide, sodium hydrosulfide, ammonium sulfide, potassium sulfide, barium sulfide and calcium sulfide.

20. A process as described in claim 19 wherein the water-soluble sulfide is employed in amounts between about 0.01 mole of sulfur per mole of nickel and 0.1 mole of sulfur per mole of nickel.

21. A process as described in claim 8 wherein any generated acids other than carbonic acid are neutralized by the addition of a nickel-complexing compound selected from the group consisting of ammonia, monoethanolamine, 2-(2-aminoethylamino)ethanol, ethylenediamine, n-butylamine, 1,2-propanediamine and 1,3-propanediamine.

22. A process as described in claim 8 wherein any generated acids other than carbonic acid are neutralized by the addition of a base.

23. A process as described in claim 8 wherein acids other than carbonic acid are neutralized with at least one base selected from the group consisting of sodium hydroxide, sodium carbonate, sodium bicarbonate and potassium hydroxide in amounts which substantially stoichiometrically correspond to the amount of generated acid.

24. A process as described in claim 10 wherein at least one solid reducing reagent selected from the group consisting of sponge iron, zinc or aluminum powder is employed in amounts not exceeding about 1.1 moles per mole of nickel.

25. A process for recovering nickel as substantially pure nickel carbonyl from reducible nickel compounds containing at least one carbonyl-forming impurity selected from the group consisting of iron and cobalt which comprises establishing an aqueous bath containing between about 80 grams per liter and 270 grams per liter of nickel as a reducible nickel compound, which compound is contaminated with at least one carbonyl-forming impurity selected from the group consisting of cobalt and iron, up to about 8 moles per mole of nickel of a nickel-complexing compound selected from the group consisting of ammonia, monoethanolamine, 2-(2-aminoethylamino)ethanol, ethylene-diamine, n-butylamine, 1,2-propanediamine and 1,3-propane-diamine, sufficient amounts of a base to neutralize any generated acids other than carbonic acid and between about 0.01 mole per mole of nickel and 0.1 mole per mole of nickel of a water-soluble sulfide selected from the group consisting of sodium sulfide, sodium hydrosulfide, hydrogen sulfide, ammonium sulfide, potassium sulfide, barium sulfide and calcium sulfide; heating the nickel-containing aqueous bath to a temperature of between about 140° C. and 180° C.; adding to the heated aqueous bath at least one reductant selected from the group consisting of carbon monoxide, hydrogen, sponge iron, iron carbonyl, zinc powder and aluminum powder to reduce nickel contained in the heated aqueous bath; and treating the heated aqueous bath with carbon monoxide at partial pressures between about 50 and 65 atmospheres to form substantially pure nickel carbonyl.

26. A process for recovering nickel as substantially pure nickel carbonyl from nickel salts containing at least one impurity selected from the group consisting of iron and cobalt which comprises establishing an aqueous solution of at least one of the nickel salts; heating the aqueous solution to a temperature between about 100° C. and 200° C.; adding to the aqueous solution a water-soluble sulfide in small but effective amounts to promote carbonylation; adding a reducing reagent to the heated aqueous solution, while neutralizing any generated acids other than carbonic acid; and treating the heated aqueous solution with carbon monoxide at partial pressures of more than about 30 atmospheres to form substantially pure nickel carbonyl.

27. A process for recovering nickel as substantially pure nickel carbonyl from nickel salts containing at least one impurity selected from the group consisting of iron and cobalt which comprises establishing an aqueous solution of at least one of the nickel salts; heating the aqueous solution to a temperature between about 100° C. and 200° C.; adding to the aqueous solution a water-soluble sulfide in small but effective amounts to promote carbonylation; treating the heated aqueous solution with a reducing reagent; adding an acid neutralizing reagent to the aqueous solution to maintain the pH value of the solution at a value no less than an aqueous solution saturated with carbon dioxide under carbonylation conditions; and treating the heated aqueous solution with carbon monoxide at partial pressures of more than about 30 atmospheres to form substantially pure nickel carbonyl.

28. A process for separating nickel from cobalt and iron contained in nickeliferous oxide ores which comprises leaching, with or without a prior selective reduction to reduce a preponderant part of the nickel and cobalt and only controlled amounts of iron, the nickeliferous oxide ore to produce a pregnant aqueous solution of nickel and cobalt with controlled amounts of iron; precipitating nickel from the pregnant aqueous solution as water-insoluble reducible nickel compounds containing cobalt and controlled amounts of iron; recovering the precipitated water-insoluble reducible nickel compounds; establishing an aqueous slurry of said water-insoluble reducible nickel compounds; adding a water-soluble sulfide to the slurry in small but effective amounts to promote carbonylation; heating the slurry to a temperature between about 100° C. and 200° C.; contacting the heated slurry with a reducing reagent; and treating the heated slurry with carbon monoxide at partial pressures of more than about 30 atmospheres to form substantially pure nickel carbonyl.

29. A process for recovering nickel as substantially pure nickel carbonyl from substantially water-insoluble impure reducible nickel compounds which comprises establishing an aqueous slurry of the impure reducible nickel compound; adding a water-soluble sulfide to the slurry in small but effective amounts to promote carbonylation; heating the slurry to a temperature between about 100° C. and 200° C.; and treating the slurry with carbon monoxide at partial pressures of more than about 30 atmospheres to form substantially pure nickel carbonyl.

30. A process for separating nickel from cobalt and iron contained in nickeliferous oxide ores which comprises selectively reducing the nickeliferous oxide ore to reduce a preponderant part of the nickel and cobalt and only controlled amounts of iron; leaching the selectively reduced ore to produce a pregnant aqueous solution of nickel and cobalt with only controlled amounts of iron; precipitating nickel, cobalt and iron from the pregnant aqueous solution as water-insoluble reducible compounds; separating the reducible compounds from the aqueous solution; establishing an aqueous slurry of said water-insoluble reducible compounds; adding to the waterbinsoluble sulfide in small but effective amounts to promote carbonylation; heating the slurry to a temperature between about 100° C. and 200° C.; contacting the heated slurry with a reducing reagent; and treating the heated slurry with carbon monoxide partial pressures of more than about 30 atmospheres to form substantially pure nickel carbonyl.

* * * * *